United States Patent Office 3,423,401
Patented Jan. 21, 1969

3,423,401
N-AMINO-ALKYLATED HETEROCYCLIC COMPOUND
Henri Morren, Forest, Belgium, assignor to UCB (Union Chimique Chemische Bedrijven) S.A.
No Drawing. Filed Oct. 20, 1965, Ser. No. 499,025
Claims priority, application Great Britain, Nov. 9, 1964, 45,614/64
U.S. Cl. 260—239
Int. Cl. A61k 27/00; C07d 41/08
9 Claims

ABSTRACT OF THE DISCLOSURE

N-amino-propyl-benzazocines of the formula

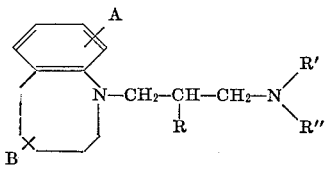

wherein A is H, halogen, lower alkyl or lower alkoxy, B is H or lower alkyl, and each of R, R' and R" is H or lower alkyl, are useful as anti-depressives.

---

The present invention is concerned with new N-aminoalkylated heterocyclic derivatives as well as the organic or inorganic salts thereof.

The new N-aminoalkylated heterocyclic derivatives according to the present invention can be represented by the general formula:

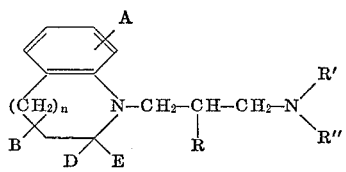

wherein A is a hydrogen atom, a halogen atom, a lower alkyl radical or an alkoxy radical, B is a hydrogen atom or a lower alkyl radical, D and E are hydrogen atoms R, R' and R", which may be the same or different, are hydrogen atoms or lower alkyl radicals and $n$ is 3.

The compounds according to the present invention are nitrogen-substituted benzazacycloalkanes, namely derivatives of 1-benzazocines. When D and E together represent an oxygen atom, the compounds are N-substituted benzazacycloalkanones, i.e. derivatives of (2H)-1-benzazepine-2-one when $n$ is 2, of (1H)-1-benzazocine-2-one when $n$ is 3 or of (2H)-1-benzazonine-2-one when $n$ is 4.

The following methods may, for example, be used for the preparation of the corresponding benzazacycloalkanones:

(a) Reaction of an alkali metal derivative of an appropriate benzazacycloalkanone of general Formula II with an appropriate 1-bromo-2-R-3-chloropropane of general Formula III to give, in the first stage, a terminally chlorinated compound of general Formula IV which reacts, in the second stage, with an appropriate amine of general formula HNR'R", according to the following equation:

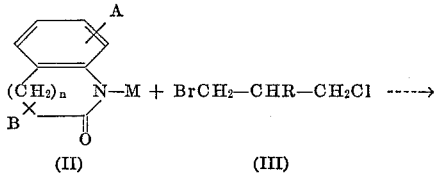

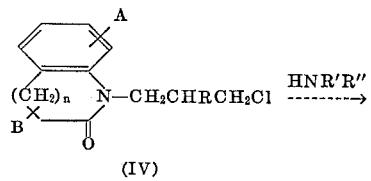

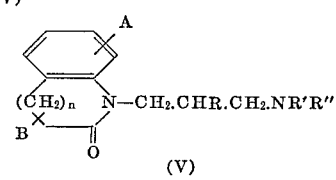

wherein A, B, R, R', R" and $n$ have the same meanings as above and M is an alkali metal.

(b) Reaction of an alkali metal derivative of a benzazacycloalkanone of general Formula II with a 1-chloro-2-R-3-R',R"-aminopropane of general Formula VI, according to the following equation:

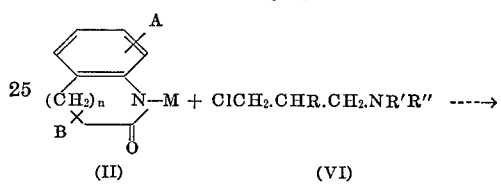

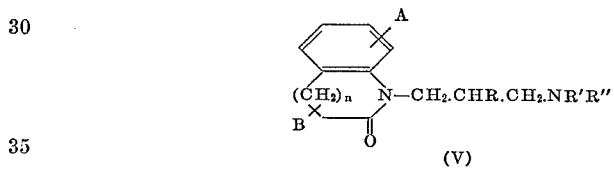

wherein A, B, M, R, R', R" and $n$ have the same meanings as above.

(c) In order to obtain the substituted benzazacycloalkanes according to the present invention of general Formula VII, the corresponding substituted benzazacycloalkanones of general Formula V, obtainable according to method (a) or (b) described above, are reduced in known manner, according to the following equation:

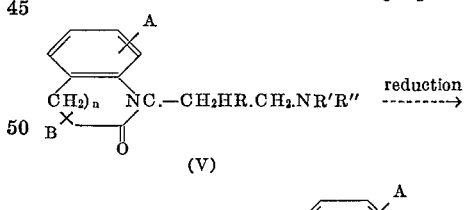

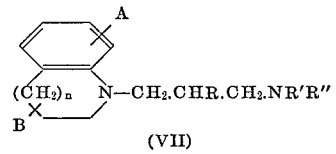

(d) For the preparation of N-monoalkylaminated benzazacycloalkanes of general Formula VII in which R" is a hydrogen atom, the following method can also be used: starting from a substituted benzazacycloalkanone of general Formula V in which R' is an alkyl radical and R" is a radical which can readily be split off, such as a benzyl radical, this compound is reduced in known manner, in a first stage, to give a benzazacycloalkane of general Formula VIII. This then reacts, in a second stage, with ethyl chloroformate to give the corresponding N-carbethoxy compound of general Formula IX which, by decarbethoxylation, in a third stage, gives a N-monosubstituted compound according to the present invention of general Formula VII, this process being illustrated by the following equation:

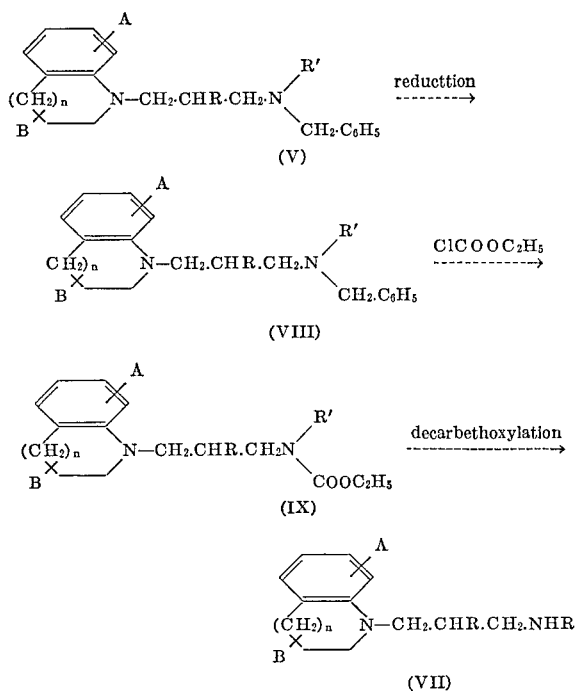

(e) This synthesis can also be carried out in two stages: a benzazacycloalkane of general Formula X reacts with a 1-bromo-2-R-3-chloropropane of Formula III and the resulting terminally chlorinated derivative (XI) reacts with an amine H₂NR', as illustrated by the following equation:

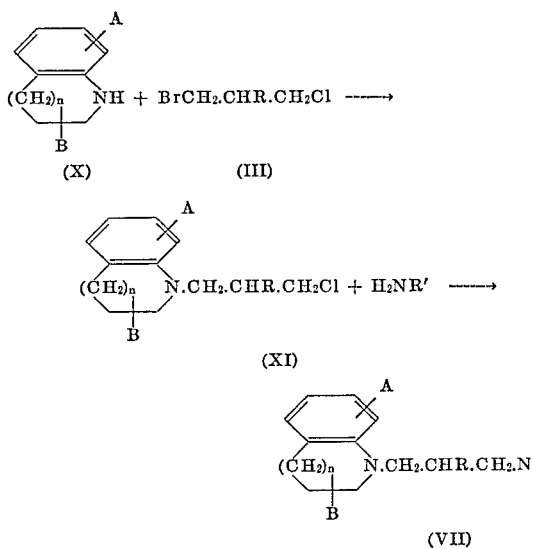

(f) In the particular case of the substituted benzazacycloalkanes according to the present invention in which R' and R" are both alkyl radicals, these may be prepared by reacting a benzazacycloalkane of general Formula X with a 1-chloro-2-R-3-R',R"-aminopropane of general Formula VI according to the following equation:

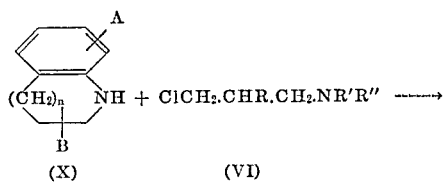

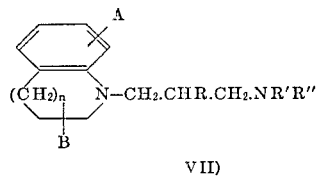

The new compounds according to the present invention possess a strong anti-depressive activity, as is evidenced by pharmacological tests. In the following table, compounds 1 and 2 according to the present invention are compared with known compounds 3, 4, 5 and 6 which are therapeutically used as anti-depressives:

compound 1: 1 - (3-methylamino-2-methyl-propyl)-1,2,3,4,5,6-hexahydro-1-benzazocine compound 2: 1 - (3-methylamino-propyl)-3-methyl-1,2,3,4,5,6-hexahydro-1-benzazocine compound 3: 5 - (3-methylamino-propyl)-10,11-dihydro-5H-dibenzo-(b,f)-azepine compound 4: 5-(3-dimethylamino-propyl)-10,11-dihydro-5H-dibenzo-(b,f)-azepine compound 5: 5-(3-dimethylamino-propylidene)-10,11-dihydro-5H-dibenzo-(a,d)-cycloheptene compound 6: 5 - methyl-10-(2-dimethylamino-ethyl)-10,11-dihydro-11-oxo-5-dibenzo-(b,e)-(1,4)-diazepine.

The following table gives (a) the toxicity LD 50 in mg./kg. determined in the rat by intravenous injection, (b) the results of test 1 concerning the anti-tetrabenazine action, the coefficient of activity of compound 3 being taken as 100, and (c) the results of test 2 concerning the potentiation of the motor activity, expressed in mg./kg.

TABLE

| Compound | Toxicity | Test 1 | Test 2 |
|---|---|---|---|
| 1 | 46.8 | About 100 | 9 |
| 2 | 35 | Less than 100, more than 50 | |
| 3 | 22.6 | 100 | 30 |
| 4 | 26 | About 100 | 31 |
| 5 | 18 | ....do.... | 10 |
| 6 | 32 | About 50 | |

Test 1 is carried out according to the method of M. Giurgea et al. (Med. Experimentalis, 9, (1963), 249–62). There is determined the anti-depressive dose which, administered subcutaneously in rats 1 hour before the subcutaneous administration of 10 mg. tetrabenazine per kg., results, in 50% of the animals, in the opening of the palpebral fissure and a normal reactivity.

Test 2 is carried out according to the technique of E. Frommel and C. Fleury (Med. Experimentalis, 1 (1959), 264–68). Measurement is made with the apparatus of F. Moeyersoons (Proc. 3rd Intern. Conf. on Medical Electronics, London, 1960, p. 209). There is determined the anti-depressive dose which, administered subcutaneously at the same time as 10 mg. amphetamine sulfate per kg. (which is a sub-active dose), clearly augments the motor activity of the animals.

From the above table, it can be seen that for an activity (test 1) substantially equal to the activities of compounds 3, 4 and 5, which are the strongest anti-depressives hitherto known, compounds 1 and 2 according to the present invention are obviously less toxic. Test 2 shows that only 9 mg. of compound 1 per kg. are necessary to potentiate the motor activity of amphetamine; compound 5 possesses an equally good potentiation activity but its toxicity is about 2.5 times as much.

Furthermore, contrary to compounds 4 and 5, compounds 1 and 2 are completely lacking in anti-acetylcholine activity. In other words, compounds 1 and 2 according to the present invention offer the advantage of not having a mydriatic nor anti-salivary activity.

The following examples are given for the purpose of illustrating the present invention:

EXAMPLE 1.—PREPARATION OF BENZAZACYCLOALKANONES (V) BY METHOD (a)

Stage 1: Preparation of chloro derivatives of general Formula IV (1) 1 - (3 - chloropropyl)-1,3,4,5-tetrahydro-(2H)-1-benzazepine-2-one. Boiling point: 116–118° C./0.001 mm. Hg.

*Analysis.*—Calculated for $C_{13}H_{16}ClNO$: N, 5.90%; Cl, 14.91%. Found: N, 5.94%, Cl, 15.26%.

1,3,4,5 - tetrahydro - (2H)-1-benzazepine-2-one (161.2 g.) is slowly added to a suspension of sodamide, prepared from 24 g. metallic sodium in 1.5 litres liquid ammonia. After stirring for 20 minutes, 1-bromo-3-chloropropane (436 g.) is added, with stirring. After evaporation of the ammonia, toluene (300 ml.) is added and the reaction mixture boiled under reflux for 10 minutes. After treatment with water and evaporation of the solvent, the reaction product is distilled.

The following compounds are prepared in an analogous manner:

(2) 1 - (3-chloropropyl)-3,4,5,6-tetrahydro-1-benzazocine-2-one. Melting point: 68–69° C., after recrystallization from petroleum ether (B.P. 40–60° C.).

*Analysis.*—Calculated for $C_{14}H_{18}ClNO$: N, 5.56%; Cl, 14.08%. Found: N, 5.42%; Cl, 13.40%.

(3) 1 - (3-chloro-2-methyl-propyl)-3,4,5,6-tetrahydro-1-benzazocine-2-one.

*Analysis.*—Calculated for $C_{15}H_{20}ClNO$: N, 5.26%; Cl, 13.37%. Found: N, 5.25%; Cl, 12.94%.

A crude product is obtained from which unreacted starting material is eliminated by recrystallization from petroleum ether (B.P. 40–60° C.).

(4) 1 - (3 - chloropropyl)-3-methyl-3,4,5,6-tetrahydro-1-benzazocine-2-one. Melting point: 101–103° C., after recrystallization from petroleum ether (B.P. 40–60° C.).

*Analysis.*—Calculated for $C_{15}H_{20}ClNO$: N, 5.26%; Cl, 13.37%. Found: N, 5.37%; Cl, 13.10%.

The 3-methyl-3,4,5,6-tetrahydro-1-benzazocine used for the preparation of this compound, is itself prepared in the following manner: a mixture of 50 g. 6-methyl-5H-6,7,8,9-tetrahydrobenzocycloheptene-5-one, 27.5 g. sodium azide and 215 ml. glacial acetic acid is heated to 50–55° C. Sulfuric acid (42.5 ml.) is slowly added, while maintaining the temperature at the same level. After stirring for 90 minutes at this temperature, the reaction mixture is neutralized with a solution of sodium hydroxide and the formed precipitate filtered off. After recrystallization from benzene, the desired compound (M.P. 172–173° C.) is obtained.

(5) 9 - chloro-1-(3-chloropropyl)-3,4,5,6-tetrahydro-1-benzazocine-2-one (used crude).

This compound has been prepared from 9-chloro-3,4,5,6-tetrahydro-(1H)-1-benzazocine-2-one (M.P. 191–192° C.), which had itself been synthesized from 5-p-chlorophenyl-pentanoic acid (M.P. 76–77° C.) via the cyclic 3-chloro - 6,7,8,9-tetrahydrobenzocycloheptene-5-one (B.P. 92–94° C./0.001 mm. Hg; $n_D^{20}=1.5727$) and the corresponding oxime (M.P. 144–145° C.).

Stage 2: Reaction of the chloro derivative (IV) with an amine (1) 1-(3-aminopropyl) - 1,3,4,5-tetrahydro - (2H)-1-benzazepine-2-one. Boiling point: 112-114° C./0.001 mm. Hg.

*Analysis.*—Calculated for $C_{13}H_{18}N_2O$: N, 12.80%. Found: N, 13.02%.

17.5 g. 1-(3-chloropropyl) - 1,3,4,5 - tetrahydro-(2H)-1-benzazepine-2-one, 100 ml. liquid ammonia and 80 ml. toluene are heated in an autoclave, while stirring, for 10 hours at 95–100° C. After separation of the ammonium chloride by filtration and evaporation of the filtrate, the residue is distilled.

In an analogous manner, the following compounds are obtained, starting from the corresponding chloro derivatives and the appropriate amines.

(2) 1 - (3-methylamino-propyl) - 3,4,5,6-tetrahydro-1-benzazocine-2-one. Melting point of the hydrochloride, recrystallized from isopropanol: 178–179° C.

*Analysis.*—Calculated for $C_{16}H_{24}N_2O \cdot C_2O_4H_2$: N, Cl⁻, 12.53%. Found: N, 9.90%; Cl⁻, 12.54%.

(3) 1 - (3-methylamino-propyl)-3-methyl-3,4,5,6-tetrahydro-1-benzazocine-2-one. Melting point of the hydrochloride, recrystallized from isopropanol: 181–183° C.

*Analysis.*—Calculated for $C_{16}H_{24}N_2O \cdot HCl$: N, 9.44%; Cl⁻, 11.94%. Found: N, 9.22%; Cl⁻, 12.39%.

(4) 1 - (3-dimethylamino-propyl)-3,4,5,6 - tetrahydro-1-benzazocine-2-one. Boiling point: 113–115° C./0.001 mm. Hg. Melting point of the oxalate, recrystallized from isopropanol: 135–137° C.

*Analysis.*—Calculated for $C_{16}H_{24}N_2O \cdot C_2H_2O_4$: N, 7.99%. Found: N, 7.97%.

(5) 1-(3-dimethylamino-2-methyl-propyl)-3,4,5,6-tetrahydro-1-benzazocine-2-one. Boiling point: 117–118° C./0.001 mm. Hg.

*Analysis.*—Calculated for $C_{17}H_{26}N_2O$: N, 10.21%. Found: N, 10.01%.

(6) 1 - (3-N-benzyl-N-methylamino-2-methyl-propyl)-3,4,5,6 - tetrahydro-1-benzazocine-2-one. Boiling point: 164–168° C./0.001 mm. Hg.

*Analysis.*—Calculated for $C_{23}H_{30}N_2O$: N, 7.99%. Found: N, 8.15%.

(7) 1 - (3-N-benzyl-N-methylamino-propyl) - 1,3,4,5-tetrahydro - (2H)-1-benzazepine-2-one. Boiling point: 178–180° C./0.001 mm. Hg.

*Analysis.*—Calculated for $C_{21}H_{26}N_2O$: N, 8.68%. Found: N, 8.76%.

(8) 9-chloro-1-(3-methylamino-propyl) - 3,4,5,6-tetrahydro-1-benzazocine-2-one. Melting point of the hydrochloride (recrystallized from acetone - alcohol): 181–182° C.

*Analysis.* — Calculated for $C_{15}H_{21}ClN_2O \cdot HCl$: N, 8.83%. Cl⁻, 11.17%. Found: N, 8.75%. Cl⁻, 11.25%.

EXAMPLE 2.—PREPARATION OF BENZAZACYCLOALKANONES (V) BY METHOD (b)

(1) 1 - (3-N-benzyl-N-methylamino-2-methyl-propyl)-1,3,4,5-tetrahydro - 1 - (2H)-benzazepine-2-one. Boiling point: 175–180° C./0.001 mm. Hg.

1,3,4,5-tetrahydro-1-(2H)-benzazepine-2-one (30.6 g.) is introduced into a suspension of sodamide prepared from 4.4 g. metallic sodium in 400 ml. liquid ammonia. After stirring for 20 minutes, 1-N-benzyl-N-methylamino-3-chloro-2-methyl-propane (39 g.) is added. The ammonia is subsequently evaporated, toluene (100 ml.) is added and the reaction mixture rapidly boiled under reflux for 10 minutes. Dimethyl formamide (60 ml.) is then added and boiling under reflux continued for a further 4 hours. After treating the reaction mixture with water and evaporating the solvents, the residue is distilled to give the desired product.

(2) 1 - (3-dimethylamino-propyl)-1,3,4,5-tetrahydro-1-(2H)-benzazepine-2-one. Boiling point: 110–112° C./0.001 mm. Hg.

*Analysis.*—Calculated for $C_{15}H_{22}N_2O$: N, 11.33%. Found: N, 11.20%.

Melting point of the corresponding oxalate, recrystallized from methanol: 170–172° C.

*Analysis.*—Calculated for $C_{15}H_{22}N_2O \cdot C_2H_2O_4$: N, 8.33%. Found: N, 8.20%.

This compound is prepared in the same manner as the preceding compound but using 1-chloro-3-dimethylamino-propane instead of 1-benzyl-methylamino-3-chloro-2-methyl-propane.

(3) 1 - (3-dimethylamino-2-methyl-propyl)-3-ethyl-3,4,5,6-tetrahydro-(1H) - 1 - benzocine-2-one. Boiling point: 110–112° C./0.001 mm. Hg.

*Analysis.*—Calculated for $C_{19}H_{30}N_2O$: N, 9.26%. Found: N, 9.11%.

This compound is prepared as described above, or according to the following method:

Sodium hydride (0.23 mol) is added to a suspension of 48 g. 3-ethyl-3,4,5,6-tetrahydro-1H-benzazocine-2-one in 100 ml. dimethylformamide to obtain the sodium derivative. 1-chloro-3- dimethylamino-2-methyl-propane (34 g.) is then added and the mixture heated for 10 hours at 70–75° C. The reaction product is poured into water and extracted with benzene. The benzenic solution is concentrated under vacuum and then extracted with an aqueous (20%) hydrochloric acid solution. The acid solution is alkalized with a 20% sodium hydroxide solution and the reaction product extracted with benzene. The benzenic solution is concentrated under vacuum and distilled.

The 3-ethyl-3,4,5,6-tetrahydro-1H-1-benzazocine-2-one (M. P.: 110–111° C.) used as the starting material is obtained by oximation of 6-ethyl-6,7,8,9-tetrahydro-benzocycloheptene-5-one (M.P. of the oxime: 100–101° C.) which is converted into the lactame by means of polyphosphoric acid according to the method of R. Conley and L. Franck (J. Org. Chem 27, (1962), 3844).

This method has been used to prepare the following cycloalkanones:

(4) 9-chloro-1-(3-dimethylamino-2-methyl - propyl)-3,4,5,6-tetrahydro - (1H) - 1-benzazocine-2-one. Boiling point: 133–135° C./0.001 mm. Hg.

*Analysis.*—Calculated for $C_{17}H_{25}ClN_2O$: N, 9.06%; Cl, 11.47%. Found: N, 8.87%; Cl, 11.25%.

This compound has been prepared from 9-chloro-3,4,5,6-tetrahydro-(1H)-benzazocine-2-one.

(5) 9 - chloro-1-(3-dimethylamino-propyl)-4-methyl-3,4,5,6 - tetrahydro-(1H)-1-benzazocine-2-one (undistilled product).

This compound has been prepared from 9-chloro-4-methyl-3,4,5,6-tetrahydro-(1H) - 1 - benzazocine-2-one (M.P.: 193–194° C.), which had itself been synthesized from 5-(p-chlorophenyl)-3-methyl-pentanoic acid chloride (the acid itself being known according to U.S.P. 3,120,551) via the cyclic 3-chloro-7-methyl-6,7,8,9-tetrahydro-cycloheptene-5-one (B.P.: 95–97° C./0.001 mm. Hg) and the corresponding oxime (M.P.: 109–110° C.).

(6) 9 - chloro-1-(3-dimethylamino-2-methyl-propyl)-4-methyl-3,4,5,6-tetrahydro-1-benzazocine-2-one (undistilled product).

This compound has been prepared from the same cycloalkanone as in the preceding point 5.

(7) 8 - methoxy-1-(3-dimethylamino-2-methyl-propyl)-1,3,4,5-tetrahydro-(2H) - 1 - benzazepine-2-one. Boiling point: 130–132° C./0.001 mm. Hg.

*Analysis.*—Calculated for $C_{17}H_{26}N_2O_2$: N, 9.64%. Found: N, 9.46%.

This compound has been prepared from 8-methoxy-1,3,4,5-tetrahydro-1-benzazepine-2-one (which is a known substance).

(8) 1-(3-dimethylamino-2-methyl-propyl) - 1,3,4,5,6,7-hexahydro-(2H)-1-benzazonine-2-one (undistilled product).

This compound has been prepared from 1,3,4,5,6,7-hexahydro - (2H) - 1 - benzazonine-2-one (a known substance).

(9) 4,9-dimethyl-1-(3-dimethylamino-propyl) - 3,4,5,6-tetrahydro - (1H) - 1 - benzazocine-2-one. Boiling point: 124–126° C./0.001 mm. Hg.

*Analysis.*—Calculated for $C_{18}H_{28}N_2O$: N, 9.72%. Found: N, 9.59%.

This compound has been prepared from 4,9-dimethyl-3,4,5,6-tetrahydro-(1H)-1-benzazocine-2-one (M.P.: 183–184° C.) which had itself been obtained from 3-methyl-5-p-methylphenyl-pentanoic acid (M.P.: 59–60° C.), via the cyclic 3,7 - dimethyl - 6,7,8,9 - tetrahydro-benzocycloheptene-5-one (B.P.: 82–84° C./0.001 mm. Hg) and the corresponding oxime (M.P.: 130–131° C.).

EXAMPLE 3.—PREPARATION OF BENZAZACYCLOALKANES (VII) BY REDUCTION (1) 1-(3-aminopropyl)-2,3,4,5-tetrahydro-(1H)-1-benzazepine. Melting point: 55–56° C. Melting point of the dihydrochloride, recrystallized from ethanol: 232–233° C. (decomposition).

*Analysis.*—Calculated for $C_{13}H_{20}N_2 \cdot 2HCl$: N, 10.10%; Cl−, 25.47%. Found: N, 9.90%; Cl−, 25.23%.

1 - (3 - aminopropyl) - 1,3,4,5 - tetrahydro-(2H)-1-benzazepine-2-one (15 g.) is slowly added at a temperature of 15 to 25° C. to a suspension of 7.5 g. lithium aluminium hydride in 400 ml. ether. After boiling under reflux for 15 hours, the reaction mixture is decomposed with a dilute solution of sodium hydroxide. The ethereal solution is subsequently separated by decantation and evaporated. The residue is recrystallized from petroleum ether (B.P.: 40–60° C.).

The following compounds are prepared from the corresponding benzazacycloalkanones:

(2) 1 - (3 - dimethylamino - propyl) - 2,3,4,5 - tetrahydro - (1H) - 1 - benzazepine. Boiling point: 78–80° C./0.001 mm. Hg. Melting point of the oxalate, recrystallized from isopropanol: 136–137° C.

*Analysis.*—Calculated for $C_{15}H_{24}N_2 \cdot C_2H_2O_4$: N, 8.68%. Found: N, 8.57%.

(3) 1 - (3 - methylamino - propyl) - 1,2,3,4,5,6-hexahydro-1-benzazocine (see, as well, Example 5 further on). Melting point of the hydrochloride, recrystallized from isopropanol: 165–166° C.

*Analysis.*—Calculated for $C_{15}H_{24}N_2 \cdot HCl$: N, 10.42%; Cl−, 13.19%. Found: N, 10.41%; Cl−, 13.1%.

(4) 1 - (3 - dimethylamino - propyl) - 1,2,3,4,5,6-hexahydro-1-benzazocine. Melting point of the oxalate, recrystallized from ethanol: 130–131° C.

*Analysis.*—Calculated for $C_{16}H_{26}N_2 \cdot C_2H_2O_4$: N, 8.38%. Found: N, 8.57%.

(5) 1 - (3 - methylamino - propyl) - 3 - methyl - 1,2,3,4,5,6-hexahydro-1-benzazocine. Melting point of the dihydrochloride, recrystallized from isopropanol: 166–167° C.

*Analysis.*—Calculated for $C_{16}H_{26}N_2 \cdot 2HCl$: N, 8.77%; Cl−, 22.21%. Found: N, 8.55%; Cl−, 21.94%.

(6) 1 - (3 - dimethylamino - 2 - methyl - propyl)-1,2,3,4,5,6-hexahydro-1-benzazocine (see, as well, Example 6 further on). Boiling point: 81–84° C./0.001 mm. Hg. Melting point of the oxalate, recrystallized from isopropanol: 142–143° C.

*Analysis.*—Calculated for $C_{17}H_{28}N_2 \cdot C_2H_2O_4$: N, 7.99%. Found: N, 8.07%.

(7) 1 - (3 - N - benzyl-N-methylamino-propyl)-2,3,4,5-tetrahydro-(1H)-1-benzazepine. Boiling point: 140–145° C./0.001 mm. Hg.

*Analysis.*—Calculated for $C_{21}H_{28}N_2$: N, 9.08%. Found: N, 8.96%.

(8) 1 - (3 - N - benzyl - N - methylamino - 2 - methyl-propyl)-2,3,4,5-tetrahydro-(1H)-1-benzazepine. Boiling point: 140–145° C./0.001 mm. Hg.

*Analysis.*—Calculated for $C_{22}H_{30}N_2$: M.W., 322.5. Found: M.W., 326 (by titration).

(9) 1 - (3 - N - benzyl - N - methylamino - 2 - methyl-propyl) - 1,2,3,4,5,6 - hexahydro - 1 - benzazocine. Boiling point: 143–146° C./0.001 mm. Hg.

*Analysis.*—Calculated for $C_{23}H_{32}N_2$: N, 8.32%. Found: N, 8.19%.

(10) 1 - (3 - dimethylamino - 2 - methyl - propyl)-3-ethyl - 1,2,3,4,5,6 - hexahydro - 1 - benzazocine. Boiling point: 118–120° C./0.001 mm. Hg.

*Analysis.*—Calculated for $C_{19}H_{32}N_2$: N, 9.70%. Found: N, 9.59%.

(11) 9 - chloro - 1 - (3 - dimethylamino - 2 - methyl-propyl)-4-methyl-1,2,3,4,5,6-hexahydro - 1 - benzazocine. Boiling point: 108–110° C./0.001 mm. Hg. Melting point of the hydrochloride: 192° C.

*Analysis.*—Calculated for $C_{18}H_{29}ClN_2 \cdot HCl$: N, 8.11%; total Cl, 20.55%. Found: N, 8.12%; total Cl, 20.45%.

(12) 9 - chloro - 1 - (3 - dimethylamino - propyl) - 4-methyl - 1,2,3,4,5,6 - hexahydro - 1 - benzazocine. Boiling point: 112–114° C./0.001 mm. Hg. Melting point of the hydrochloride: 136–137° C.

Analysis.—Calculated for $C_{17}H_{27}ClN_2 \cdot HCl$: N, 8.46%; total Cl, 21.46%. Found: N, 8.40%; total Cl, 21.28%.

(13) 4,9 - dimethyl - 1 - (3 - dimethylamino - propyl)-1,2,3,4,5,6-hexahydro-1-benzazocine. Boiling point: 102–104° C./0.001 mm. Hg. Melting point of the hydrochloride: 147–148° C.

Analysis.—Calculated for $C_{18}H_{30}N_2 \cdot HCl$: N, 9.01%; Cl⁻, 11.40%. Found: N, 9.06%; Cl⁻, 11.61%.

(14) 1 - (3 - dimethylamino - 2 - methyl - propyl)-2,3,4,5,6,7-hexahydro-(1H)-1-benzazonine. Boiling point: 96–98° C./0.001 mm. Hg. Melting point of the hydrochloride: 197–198° C.

Analysis.—Calculated for $C_{18}H_{30}N_2 \cdot HCl$: N, 9.01%; Cl⁻, 11.40%. Found: N, 9.03%; Cl⁻, 11.57%.

(15) 1 - (3 - dimethylamino - 2 - methyl - propyl)-8-methoxy-2,3,4,5-tetrahydro-(1H)-1-benzazepine. Boiling point: 120–122° C./0.001 mm. Hg.

Analysis.—Calculated for $C_{17}H_{28}N_2O$: N, 10.01%. Found: N, 10.03%.

(16) 9 - chloro - 1 - (3 - methylamino - propyl) - 1,2,3,4,5,6-hexahydro - 1 - benzazocine. Boiling point: 98–101° C./0.001 mm. Hg. Melting point of the hydrochloride: 172–173° C.

Analysis.—Calculated for $C_{15}H_{23}ClN_2 \cdot HCl$: N, 9.23%; Cl⁻, 11.69%. Found: N, 9.29%; Cl⁻, 11.64%.

(17) 9 - chloro - 1 - (3 - dimethylamino - 2 - methyl-propyl) - 1,2,3,4,5,6 - hexahydro - 1 - benzazocine. Boiling point: 93–95° C./0.001 mm. Hg.

Analysis.—Calculated for $C_{17}H_{27}ClN_2$: N, 9.50%. Found: N, 9.42%.

EXAMPLE 4.—PREPARATION OF N-MONOALKYL-AMINO-BENZAZACYCLOALKANES IN THREE STAGES

Stage 1: Reduction of the N-alkyl-N-benzyl-benzaza-cycloalkonones

This first stage is carried out in the same manner as described in Example 3 for the preparation of compounds 7, 8 and 9.

Stage 2: Carbethoxylation (1) 1-(3-N-carbethoxy-N-methylamino-propyl)-2,3,4,5-tetrahydro-(1H)-1-benzazepine. Boiling point: 120–122° C./0.001 mm. Hg.

Analysis.—Calculated for $C_{17}H_{26}N_2O_2$: N, 9.64%. Found: N, 9.50%.

Ethyl chloroformate (17.5 g.) is slowly added to a solution of 39 g. 1-(3-N-benzyl-N-methylamino-propyl)-2,3,4,5-tetrahydro-(1H)-1-benzazepine in 80 ml. benzene.

After boiling under reflux for 18 hours, the reaction mixture is steam distilled and the residue obtained is distilled.

The following carbethoxy derivatives are prepared in the same manner:

(2) 1-(3-N-carbethoxy-N-methylamino-2-methyl-propyl) - 2,3,4,5 - tetrahydro – (1H)-1 - benzazepine. Boiling point: 128–129° C./0.001 mm. Hg.

Analysis.—Calculated for $C_{18}H_{30}N_2O_2$: N, 8.79%. Found: N, 9.03%.

(3) 1-(3-N - carbethoxy - N - methylamino - 2-methyl-propyl)-1,2,3,4,5,6 - hexahydro - 1 - benzazocine. Boiling point: 138–140° C./0.001 mm. Hg.

Analysiss—Calculated for $C_{19}H_{30}N_2O_2$: N, 8.79%. Found: N, 8.66%.

This compound can also be prepared in the following manner:

Ethyl chloroformate (39.5 g.) is slowly added to a solution of 75 g. 1-(3-dimethylamino-2-methyl-propyl)-1,2,3, 4,5,6-hexahydro-1-benzazocine in 150 ml. benzene. The reaction is exothermic. When the evolution of methyl chloride slows down, the reaction mixture is boiled under reflux for 18 hours. The product is washed with water, then dried and distilled. The carbethoxy derivative (77 g.) is obtained.

The following carbethoxy derivatives have been prepared in the same way:

(4) 3-ethyl-1-(3-N - carbethoxy - N - methylamino-2-methyl-propyl)-1,2,3,4,5,6 - hexahydro - 1 - benzazocine. Boiling point: 134–136° C./0.001 mm. Hg.

Analysis.—Calculated for $C_{21}H_{34}N_2O_2$: N, 8.08%. Found: N, 7.99%.

(5) 9-chloro-1-(3-N-carbethoxy - N - methylamino - 2-methyl-propyl)-1,2,3,4,5,6 - hexahydro - 1 - benzazocine. Boiling point: 144–146° C./0.001 mm. Hg.

Analysis.—Calcullated for $C_{19}H_{29}ClN_2O_2$: N, 7.94%. Found: N, 7.86%.

(6) 4-methyl-9-chloro-1-(3 - N-carbethoxy-N-methylamino-propyl)-1,2,3,4,5,6-hexahydro-1-benzazocine. Boiling point: 150–152° C./0.001 mm. Hg.

Analysis.—Calculated for $C_{19}H_{29}ClN_2O_2$: N, 7.98%. Found: N, 8.04%.

(7) 4-methyl-9-chloro - 1 - (3-N-carbethoxy-N-methyl-amino-2-methyl-propyl) - 1,2,3,4,5,6-hexahydro-1-benzazocine. Boiling point: 153–155° C./0.001 mm. Hg.

Analysis.—Calculated for $C_{20}H_{31}ClN_2O_2$: N, 7.65%. Found: N, 7.52%.

Stage 3: Decarbethoxylation (1) 1-(3-methylamino - propyl) - 2,3,4,5-tetrahydro-(1H)-1-benzazepine. Boiling point: 98–100° C./0.005 mm. Hg. Melting point of the hydrochloride, recrystallized from isopropanol: 113–114° C.

Analysis.—Calculated for $C_{14}H_{22}N_2 \cdot HCl$: N, 11.03%; Cl⁻, 13.9%. Found: N, 11.15%; Cl⁻ 14.28%.

29 g. 1-(3-N-carbethoxy-N-methylamino-propyl)-2,3,4, 5-tetrahydro-(1H)-1-benzazepine, 63 g. crystallized barium hydroxide (containing 8 molecules of water of crystallization) and 500 ml. ethylene glycol are boiled under reflux for 18 hours. The reaction mixture is subsequently poured into water and extracted several times with benzene. The combined benzene extracts are then evaporated and the residue is distilled.

The following compounds were prepared in an analogous manner:

(2) 1-(3-methylamino-2-methyl-propyl) - 2,3,4,5-tetrahydro-(1H)-1-benzazepine. Boiling point: 92–93° C./ 0.001 mm. Hg. Melting point of the hydrochloride, recrystallized from isopropanol: 171–172° C.

Analysis.—Calculated for $C_{15}H_{24}N_2 \cdot HCl$: N, 10.42%; Cl⁻, 13.19%. Found: N, 10.33%; Cl⁻, 13.26%.

(3) 1-(3-methylamino - 2 - methyl-propyl)-1,2,3,4,5,6-hexahydro-1-benzazocine. Boiling point: 90–92° C./0.001 mm. Hg. Melting point of the hydrochloride, recrystallized from isopropanol: 168–170° C.

Analysis.—Calculated for $C_{16}H_{26}N_2 \cdot HCl$: N, 9.90%; Cl⁻, 12.53%. Found: N, 10.10%; Cl⁻, 12.36%.

(4) 3-ethyl-1-(3-methylamino - 2 - methyl-propyl)-1,2, 3,4,5,6-hexahydro-1-benzazocine. Boiling point: 105–108° C./0.001 mm. Hg. Melting point of the hydrochloride: 140–142° C.

Analysis.—Calculated for $C_{18}H_{30}N_2 \cdot HCl$: N, 9.01%; Cl⁻, 11.40%. Found: N, 8.90%; Cl⁻, 11.60%.

This compound is prepared either in the same way as the three preceding compounds or in the following manner:

10 g. of the carbethoxy derivative in 50 ml. concentrated hydrochloric acid are boiled under reflux for 20 hours, and, subsequently, concentrated under vacuum. The residue is taken up in a little water, alkalized and extracted with benzene. The benzenic solution is concentrated and the residue distilled.

The following compounds have been prepared in the same manner:

(5) 9-chloro-1-(3-methylamino - 2 - methyl-propyl)-1,2,3,4,5,6-hexahydro-1-benzazocine. Boiling point: 104–106° C./0.001 mm. Hg. Melting point of the hydrochloride: 193–194° C.

*Analysis.*—Calculated for $C_{16}H_{25}ClN_2 \cdot HCl$: N, 8.85%; $Cl^-$, 11.21%. Found: N, 8.84%, $Cl^-$, 11.42%.

(6) 4-methyl-9-chloro-1-(3 - methylamino - propyl)-1,2,3,4,5,6-hexahydro-1-benzazocine. Boiling point: 118–120° C./0.001 mm. Hg. Melting point of the hydrochloride: 139–140° C.

*Analysis.*—Calculated for $C_{16}H_{25}ClN_2 \cdot HCl$: N, 8.85%; $Cl^-$, 11.20%. Found: N, 8.80%, $Cl^-$, 10.98%.

(7) 4-methyl-9-chloro - 1 - (3-methylamino-2-methyl-propyl)-1,2,3,4,5,6 - hexahydro - 1 - benzazocine. Boiling point: 118–120° C./0.001 mm. Hg. Melting point of the hydrochloride: 156–157° C.

*Analysis.*—Calculated for $C_{17}H_{27}ClN_2 \cdot HCl$: N, 8.46%; $Cl^-$, 10.68%. Found: N, 8.37%; $Cl^-$ 10.64%.

EXAMPLE 5.—PREPARATION OF N-MONOALKYL-AMINO-BENZAZACYCLOALKANE IN 2 STAGES 1-(3-METHYLAMINO - PROPLY)-1,2,3,4,5,6-HEXAHYDRO-1-BENZAZOCINE (CFR. EXAMPLE 3, COMPOUND 3)

Stage 1: Preparation of 1-(3-chloropropyl)-1,2,3,4,5,6-hexahydro-1-benzazocine

Boiling point: 85–86° C./0.001 mm. Hg.

*Analysis.*—Calculated for $C_{14}H_{20}ClN$: N, 5.79%; Cl, 14.9%. Found: N, 5.70%; Cl, 14.7%.

A mixture of 32.2 g. 1,2,3,4,5,6-hexahydro-1-benzazocine, 33 g. 1-bromo-3-chloropropane and 24 g. anhydrous sodium carbonate is heated at 110° C. for 12 hours. Benzene (100 ml.) is added and the mixture is filtered. The solution is evaporated under vacuum and the residue is distilled.

Stage 2: Preparation of the desired methylamino derivative

The preceding chloro derivative is heated with an excess of a benzenic solution of monomethylamine in an autoclave at 100° C. for 10 hours. The mixture is filtered, washed with water and the solvent evaporated. The residue is converted into the hydrochloride which, after recrystallization from isopropanol, melts at 165–166° C.

EXAMPLE 6.—PREPARATION OF N-DIALKYL-AMINO - BENZAZACYCLOALKANES - 1 - (3 - DIMETHYLAMINO - 2 - METHYL - PROPYL) - 1,2,3,4,5,6-HEXAHYDRO-1-BENZAZOCINE (CFR. EXAMPLE 3, COMPOUND 6)

24.2 g. 1,2,3,4,5,6-hexahydro-1-benzazocine and, 10 minutes later, 22 g. 1-chloro-3-dimethylamino-2-methylpropane are introduced into a suspension of 0.15 M sodamide in 250 ml. liquid ammonia. After evaporation of the ammonia, toluene (150 ml.) is added and the mixture is boiled under reflux for 8 hours. After cooling, water (150 ml.) is added and the organic layer is separated. This is then washed with water, concentrated under vacuum and the residue is distilled.

I claim:
1. A member selected from the group consisting of N-amino-propylbenzazocines of the formula

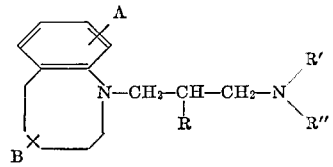

and pharmaceutically acceptable acid addition salts thereof, wherein

A is a member selected from the group consisting of hydrogen, halogen, lower alkyl and lower alkoxy, B is a member selected from the group consisting of hydrogen and lower alkyl, and each of R, R' and R'' is a member selected from the group consisting of hydrogen and lower alkyl.

2. 1 - (3 - methylamino - 2 - methylpropyl) - 1,2,3,4,5,6-hexahydro-1-benzazocine.

3. 9 - chloro - 1 - (3 - methylamino - propyl) - 1,2,3,4,5,6-hexahydro-1-benzazocine.

4. 1 - (3 - methylamino-propyl) - 1,2,3,4,5,6 - hexahydro-1-benzazocine.

5. 1 - (3 - dimethylamino - 2 - methyl - propyl) - 1,2,3,4,5,6-hexahydro-1-benzazocine.

6. 9 - chloro - 1 - (3 - methylamino - 2 - methyl - propyl)-1,2,3,4,5,6-hexahydro-1-benzazocine.

7. 9 - chloro - 1 - (3 - dimethylamino - 2 - methyl - propyl)-1,2,3,4,5,6-hexahydro-1-benzazocine.

8. 9 - chloro- 4 - methyl - 1 - (3 - methylamino - 2-methyl-propyl)-1,2,3,4,5,6-hexahydro-1-benzazocine.

9. 1 - (3 - methylaminopropyl) - 3 - methyl - 1,2,3,4,5,6-hexahydro-1-benzazocine.

References Cited

UNITED STATES PATENTS

| | | | |
|---|---|---|---|
| 3,036,064 | 5/1962 | Schindler | 260—239 |
| 3,055,883 | 9/1962 | Mull | 260—239 |

ALTON D. ROLLINS, *Primary Examiner.*

U.S. Cl. X.R.

260—239.3, 590, 566, 999